United States Patent [19]

Katsuoka et al.

[11] 3,983,369

[45] Sept. 28, 1976

[54] DIGITAL HYPERBOLIC FUNCTION GENERATOR

[75] Inventors: Ritsu Katsuoka, Okazaki; Hisasi Kawai, Toyohashi, both of Japan

[73] Assignee: Nippon Soken, Inc., Nishio, Japan

[22] Filed: May 20, 1975

[21] Appl. No.: 579,052

[30] Foreign Application Priority Data

July 20, 1974 Japan.............................. 49-83694

[52] U.S. Cl............................. 235/150.53; 235/152
[51] Int. Cl.²......................................... G06F 15/34
[58] Field of Search ...... 235/197, 156, 152, 150.53, 235/150.3; 328/142

[56] References Cited
UNITED STATES PATENTS

| | | | |
|---|---|---|---|
| 3,529,138 | 9/1970 | Andre et al..................... | 235/197 X |
| 3,573,443 | 4/1971 | Fein................................. | 235/197 X |
| 3,654,450 | 4/1972 | Webb............................... | 235/197 |
| 3,689,754 | 9/1972 | Le Febre ........................ | 235/197 |
| 3,729,625 | 4/1973 | Inoue............................... | 235/197 |

*Primary Examiner*—Joseph F. Ruggiero
*Attorney, Agent, or Firm*—Cushman, Darby & Cushman

[57] ABSTRACT

A digital hyperbolic function generator comprises a frequency dividing circuit for frequency dividing first clock signals of a fixed frequency to produce second clock signals for each fixed time interval, a setting circuit for changing the setting thereof in correspondence to the number $n$ of said second clock signals, said setting being produced in a binary code, a modulating circuit for frequency modulating said first clock signals with said setting to produce third clock signals the period of which is proportional to $$1 + n + \sum_{r=1}^{n} r,$$

and a converter circuit for producing a voltage corresponding to the number of said third clock signals. The digital hyperbolic function generator thus constructed generates a hyperbolic function of polygonal line approximation the gradient of which changes for each fixed time interval with a high accuracy, and the operation thereof is stabilized against the change in ambient temperature because the circuits are constructed by digital elements.

4 Claims, 5 Drawing Figures

3,983,369

DIGITAL HYPERBOLIC FUNCTION GENERATOR

BACKGROUND OF THE INVENTION

1. Field of the Invention

The present invention relates to a digital hyperbolic function generator which generates a hyperbolic function of polygonal line approximation with time as a variable.

2. Description of the Prior Art

Prior art, well-known hyperbolic function generators include an analog type apparatus which utilizes forward characteristics of diodes and which comprises an operational amplifier and several diodes connected to an input of the operational amplifier and having their forward conduction potentials set to different values with respect to an input voltage by dividing resistors. By appropriately selecting the settings of the conduction potentials of the diodes an output voltage which is in hyperbolic function relation with the input voltage can be polygonal line approximated, with the conduction potentials of the diodes being junction points of the polygonal line.

The above analog hyperbolic function generator, however, has a drawback in that it is difficult to provide a function generator of constant characteristic because of mismatching in the diode characteristics and the adjustment of the generator is difficult. Further, operation is unstable because of the temperature dependency of the diodes and the resistors.

Now considering a hyperbolic function $y = K/x$ (where $K$ is a constant) shown in FIG. 1, as the variable $x$ increment increases only by a fixed amount $x_o$ such that $x_o, 2x_o, 3x_o, \ldots, nx_o$ (where $n$ is an integer) the function $y$ changes to $K/x_o, K/2x_o, K/3x_o, \ldots, K/nx_o$. The polygonal line (shown by dotted line) obtained by connecting the points $A_1, A_2, A_3, A_4, A_5, A_6, A_7$ and $A_8$ is an approximation of the hyperbolic function $y = K/x$. It is seen that when the gradient of the segment $\overline{A_1A_2}$ is assumed to be 1, then the gradients of the respective segments form a progression of 1, ⅓, 1/6, 1/10, 1/15, 1/21, 1/28, 1/36. It is apparent that the smaller the constant amount $x_o$ is the more is the approximation enhanced.

SUMMARY OF THE INVENTION

In the light of the above, it is an object of the present invention to provide an improved digital hyperbolic function generator comprising a setting circuit the setting of which is varied with the number $n$ of second clock signals applied at a fixed time interval, said setting circuit producing said setting in a binary code, a modulating circuit for frequency modulating first clock signals of a fixed frequency in response to said setting to produce third clock signals the period of which is proportional to $$1 + n + \sum_{r=1}^{n} r,$$

and a converter circuit for producing a voltage corresponding to said number of said third clock signals, whereby a hyperbolic function of polygonal line approximation with time as a variable is generated while a stable operation with regard to the change in ambient temperature is assured.

The above and other objects, features and advantages of the present invention will become more apparent from the following detailed description of the preferred embodiment of the present invention when taken in conjunction with the accompanying drawings.

DESCRIPTION OF THE PREFERRED EMBODIMENT

Figure 2:
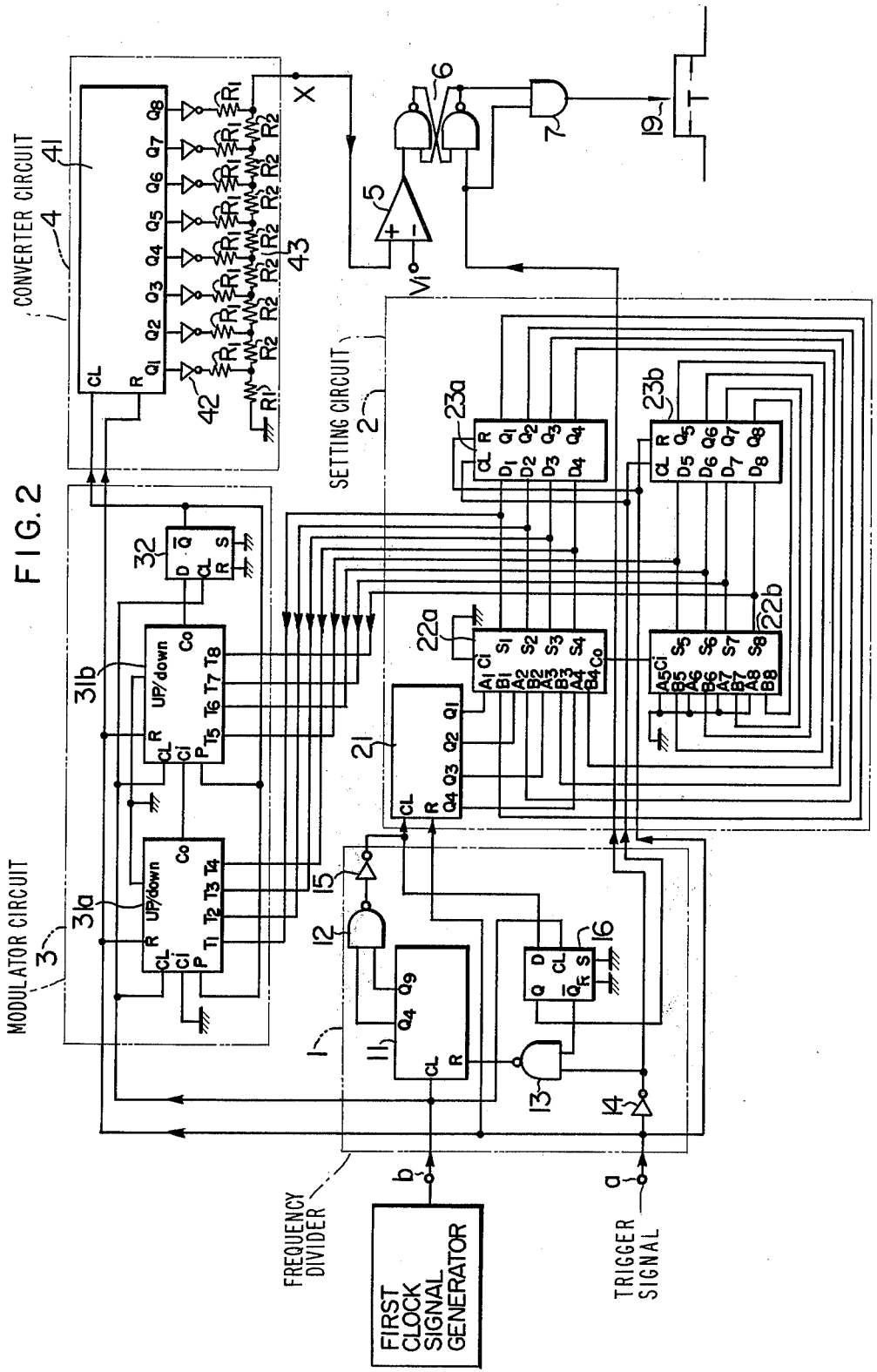
FIG. 2 is an electrical wiring diagram illustrating an embodiment of the present invention.

The present invention will now be described in connection with the illustrated preferred embodiment. Referring to FIG. 2, reference numeral 1 designates a frequency divider which, after a trigger signal is applied to a terminal $a$ thereof, frequency-divides first clock signals of a fixed frequency supplied from a first clock signal generator connected to a terminal $b$ thereof to produce second clock signals at a fixed time interval. The frequency divider 1 comprises a binary counter 11, NAND gates 12 and 13, inverters 14 and 15, and a signal delaying D-flip-flop 16. Reference numeral 2 designates a setting circuit which is responsive to the second clock signals applied at the fixed time interval from the frequency divider to change a setting output thereof. The setting circuit comprises a binary counter 21, parallel adders 22a and 22b, and signal delaying D-flip-flop 23a and 23b, with a Co output (carry out) of the parallel adder 22a being connected to a Ci input (carry in) of the parallel adder 22b to construct a parallel adder having eight-digit sum output (which is hereinafter simply referred to as a parallel adder 22), while the outputs of the D-flip-flops 23a and 23b (which are hereinafter simply referred to as D flip-flop 23) for delaying the sum output of the parallel adder 22 being fed back to a B input of the parallel adder 22, with the sum output of the parallel adder 22 being a binary code setting output from the setting circuit 2. Reference numeral 3 designates a modulator circuit for frequency modulating the first clock signals with the setting output represented in binary code from the setting circuit 2. The modulator circuit 3 comprises reversible binary counters 31a and 31b able to be preset and a signal delaying D flip-flop 32, with a Co output (carry out) of the reversible binary counter 31a being connected to a Ci input (carry in) of the presettable reversible binary counter 31b to construct a reversible binary counter able to be preset having eight-digit preset input (which is hereinafter simply referred to as a reversible counter 31). The reversible counter 31 has its count control terminal (up/down) grounded to form a count-down counter. Reference numeral 4 designates a converter circuit for producing a voltage corresponding to the number of the third clock signals from the modulator circuit 3. The converter circuit 4 comprises a binary counter 41, a group of inverters 42 each connected to a respective output of the binary counter 41, and a ladder type resistor network 43 including resistances $R_1$ and $R_2$ (=½$R_1$), with the potential at an end of the resistor $R_1$ of the most significant digit position of the binary counter 41, i.e. at point $x$, being the output of the converter circuit 4. Further, in the present embodiment, in order to produce a pulse signal the duration of which is in a hyperbolic function relation with an input voltage Vi, a comparator 5, an R-S flip-flop 6 and an AND gate 7 are provided.

Figure 3:
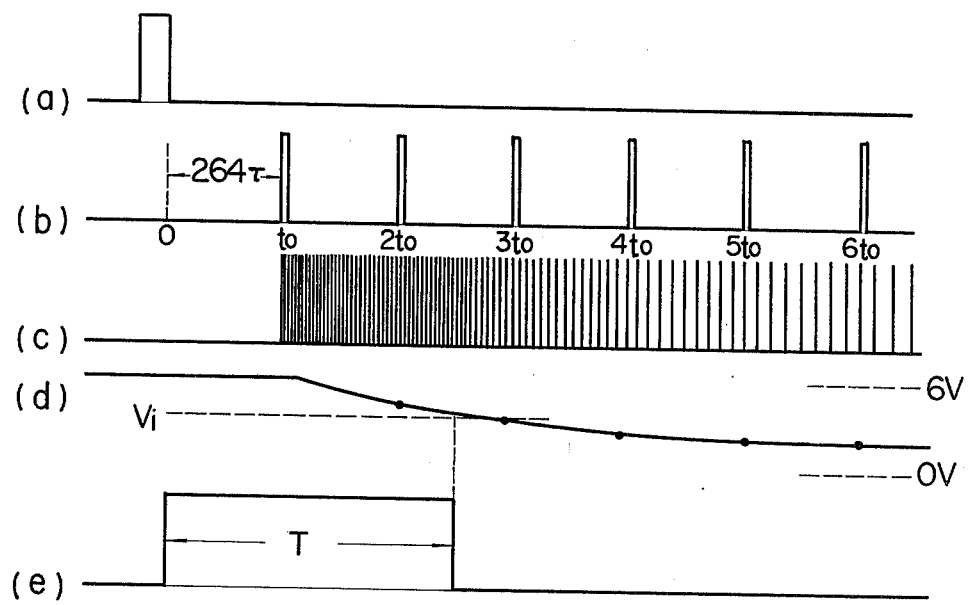
FIGS. 3, 4 and 5 show waveforms at various points in FIG. 2.
Figure 4:
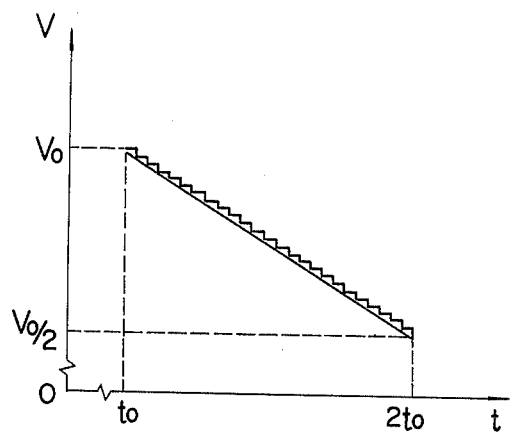

The operation of the above arrangement is now explained with reference to FIGS. 3 to 5. When a trigger signal shown in FIG. 3(a) is applied to the terminal $a$, the binary counters 11, 21 and 41, the D-flip-flop 23 and the reversible counter 31 are all reset so that the potential at the point $x$ assumes its highest potential $V_o$ (6V in the illustrated embodiment), and the trigger signal is inverted by the inverter 14 to reset the R-S flip-flop 6. After the trigger signal input, the binary counter 11 starts to count the first clock signals of the fixed frequency applied to the terminal $b$ so that the outputs $Q_4$ and $Q_9$ both assume "1" level. Thus, when the counted number of the first clock signals reaches a predetermined number (264 in the illustrated embodiment) a 1 level is applied to the D input of the D flip-flop 16 through the NAND gate 12 and the inverter 15, with the result that the D flip-flop 16 produces 1 level and "0" level at the output and the $\overline{Q}$ output, respectively with a delay of one clock interval (period $\tau$) of the first clock signals, to reset the binary counter 11 through the NAND gate 13, and the binary counter 11 again starts to count the first clock signals. Accordingly, the output of the inverter 15 produces 1 level at every fixed time interval $t_o = 265\ \tau$, and the frequency counter 1 produces the second clock signal of the fixed period to as shown in FIG. 3(b) at every fixed time interval $t_o$. The binary counter 21 is incremented in proportion with the number of the inputs of the second clock signals. The $Q_1$, $Q_2$, $Q_3$ and $Q_4$ outputs of the binary counter 21 are applied to the inputs $A_1$, $A_2$, $A_3$ and $A_4$ of the parallel adder 22. Thus, when one of the second clock signals is counted by the binary counter 21, it produces 1 level at the $Q_1$ output, and when the D flip-flop 16 produces 1 level at the Q output, the D flip-flop 23 produces 1 level at the $Q_1$ output, which is in turn fed back to the $B_1$ input of the parallel adder 22. Thus, the parallel adder 22 produces 1 level at the $S_2$ output to change its setting to 2 (= 1 + 1). When the binary counter 21 counts two of the second clock signals to produce 1 level at the $Q_2$ output, the parallel adder 22 produces 1 levels at the $S_1$ and $S_2$ outputs. Thus, when the D flip-flop 16 produces 1 level at the Q output the D flip-flop 23 produces 1 levels at the $Q_1$ and $Q_2$ outputs, which are in turn fed back to the $B_1$ and $B_2$ inputs of the parallel adder 22. Thus, the parallel adder 22 produces 1 levels at the $S_1$ and $S_3$ outputs to change its setting to 5 (= 2 + 1 + 2).

The setting circuit 2 repeats a similar operation so that the binary code setting output is changed in time $\tau$ after the second clock signals have been provided, the setting output being changed to $$n + \sum_{r=1}^{n} r$$

for the number $n$ of the second clock signals. The binary code setting of the setting circuit 2 is applied to the preset input of the reversible counter 31 which in turn counts down the first clock signals from its preset value of $$n + \sum_{r=1}^{n} r$$

until the content thereof becomes zero, at which the reversible counter 31 produces 0 level at its Co output. Thus, the $\overline{Q}$ output of the D flip-flop 32 produces 1 level with one period $\tau$ delay of the first clock signals, which output is applied to the preset control input P of the reversible counter 31 so that the latter again starts to count down from its preset value. The period of the above loop, that is, the period in which the flip-flop 32 produces the 1 level at its Q output sequentially changes with the preset value to form a progression (1 + 1 + 1) $\tau$, (1 + 2 + 1 + 2)$\tau$, (1 + 3 + 1 + 2 + 3) $\tau$, . . .

$$1 + n + \sum_{r=1}^{n} r)\ \tau.$$

Thus the frequency of the third clock signals produced at the $\overline{Q}$ output of the D flip-flop 32 changes at every fixed time interval to as shown in FIG. 3(c). The third clock signals are counted by the binary counter 41, which in turn produces 1 level at the outputs $Q_1$, $Q_2$, . . . $Q_8$ in correspondence with the content thereof. Thus, the potential at the point X is lowered in inverse proportion to the number of the third clock signals. An example of the change in the potential is shown in FIG. 4, in which during the fixed time period $t_o$ ($t_o$~$2t_o$) it changes in step function and can be regarded as a linearly varying voltage. However, since the frequency of the third clock signals changes at each fixed time interval $t_o$ as described above, the gradient of the potential at the point X also changes at each fixed time interval $t_o$ to produce gradually a general slope as shown in FIG. 5. Assuming that the gradient of segment between the time points $t_o$ and $2t_o$ in FIG. 5 is ⅓, then as the number $n$ increments for each fixed time interval $t_o$ the gradients of the respective segments form a progression of ⅓, 1/6, 1/10, . . .

$$1/(1 + n + \sum_{r=1}^{n} r).$$

Figure 1:
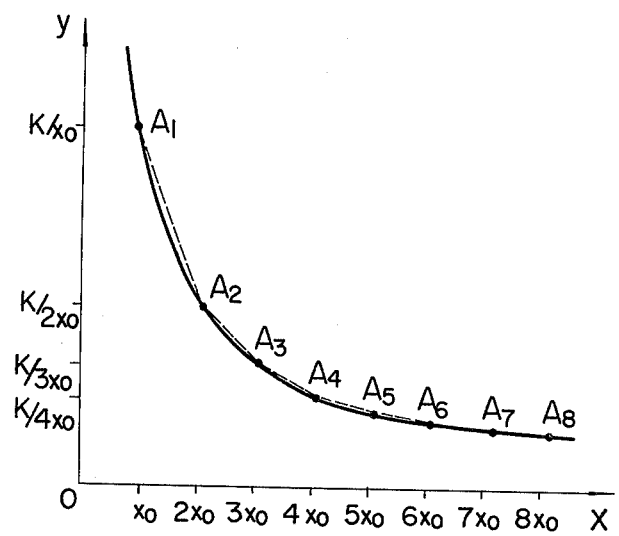
FIG. 1 shows a characteristic of a hyperbolic function $y = K/x$.
Figure 5:
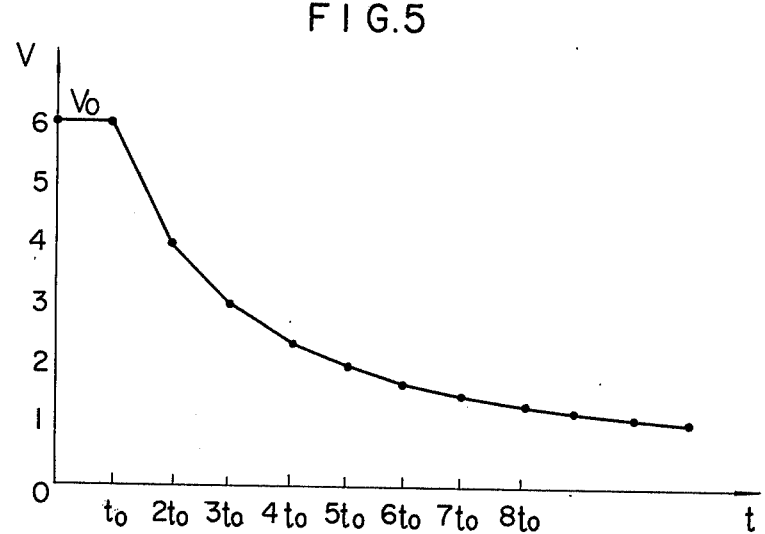

Since the above progression corresponds to the progression of the gradients of the polygonal line approximation (shown by the dashed line in FIG. 1) of the above-mentioned hyperbolic function $y = K/x$, excluding the first order term, it is seen that the output voltage of the converter circuit 4 shown in FIG. 5 is a hyperbolic function voltage of the polygonal line approximation with time as a variable.

The hyperbolic function voltage of the polygonal line approximation shown in FIG. 3(d) thus produced (which is identical to the polygonal line approximation voltage shown in FIG. 5) is then applied to a non-inverting input (+) of the comparator 5 while an inverting input (−) thereof is applied with an input voltage Vi. Thus, after a triggering input has been applied to the terminal $a$ the non-inverting input voltage from the converter circuit 4 gradually decreases and when it becomes lower than the inverting input voltage Vi the output of the comparator 5 is inverted from its 1 level to 0 level to switch the output of the R-S flip-flop 6 from 1 level to 0 level. The AND gate, which receives the output signal of the R-S flip-flop 6 and the inverted signal of the triggering signal as inputs thereto, produces a pulse signal having a duration T as shown in FIG. 3(e) by subtracting the duration of the triggering signal. There exists an approximate relationship of $T = K/Vi$ between the duration $T$ and the input voltage $Vi$. In the illustrated embodiment, where the frequency of the first clock signals is 1 MHz and the power supply voltage is 6 volts, the approximation error was less than $\pm 2\%$ in the range of 5 msec $< T <$ 0.5 msec, and hence it has been proved that the voltage produced at the point X is a logarithmic function voltage of the polygonal line approximation. As the frequency of the first clock signals becomes higher the signal propagation time in the binary counters can not be neglected, and the step-function polygonal line approximation voltage produced at the output, point X, of the converter circuit 4 would include narrow pulsive noise which might cause chattering at the output of the comparator 5, which in turn would make it difficult to obtain an accurate duration of T. The R-S flip-flop 6 is included in order to avoid the above difficulty. That is, the chattering may be eliminated by connecting the R-S flip-flop 6 to the output of the comparator 5 so that once the output of the comparator 5 has changed from 1 level to 0 level the output of the R-S flip-flop 6 is maintained at 0 level until the inverted signal of the next triggering signal is applied to the other input of the R-S flip-flop 6.

In the illustrated embodiment, it should be understood that by increasing the numbers of digit positions of the binary counters, the presettable reversible counter and the parallel adder and the number of units of the signal delay of the D flip-flops and appropriately adjusting the setting of the fixed time $t_o$, a hyperbolic function voltage of polygonal line approximation having more segments may be produced and the accuracy of the polygonal line approximation may also be enhanced.

By eliminating the group of inverters 42 in the converter circuit 4 a function with inverted voltage axis with respect to FIG. 5, that is a function voltage $V = -K/t + V$, may be produced.

In the illustrated embodiment, since the binary counter 41 and the ladder type resistor network 43 are used, relative accuracy of the respective resistors is required, but the absolute value of the resistors need not be critical, and the output voltage merely depends on the power supply voltage to the binary counter so that the affection of the non-uniformity of the components can be minimized. Similarly, since the temperature characteristics of the respective resistors tend to be cancelled by each other the instability due to the temperature change can be eliminated. By arranging the apparatus such that the number of clock signals received in the duration T of the pulse signal produced at the output of the AND gate 7 is counted, the number of pulses which is proportional to the output duration $\tau$ may be generated so that the apparatus may have an analog-to-digital conversion function.

As described hereinabove, the present invention provides a digital hyperbolic function generator comprising a setting circuit the setting of which is varied with the number $n$ of second clock signals applied at a fixed time interval, said setting circuit producing said setting in a binary code, a modulating circuit for frequency modulating first clock signals of a fixed frequency in response to said setting to produce third clock signals the period of which is proportional to $$1 + n + \sum_{r=1}^{n} r,$$

and a converter circuit for producing a voltage corresponding to said number of said third clock signals, whereby a hyperbolic function of polygonal line approximation with time as a variable is generated. Accordingly, it is an advantage that a hyperbolic function of polygonal approximation with time as a variable can be attained with a high precision. Furthermore, it is another advantage that since the circuits are constructed by digital elements, the operation of the present apparatus is stabilized against the change of the ambient temperature.

What is claimed is:

1. A digital hyperbolic function generator comprising means for generating first clock signals of a first fixed frequency, means for generating second clock signals at a fixed time interval, a setting circuit, the setting of which is varied with the number $n$ of the second clock signals, said setting circuit producing said setting in a binary code, a modulating circuit connected to said setting circuit for frequency modulating the first clock signals in response to said setting to produce third clock signals, the period of which is proportional to $$1 + n + \sum_{r=1}^{n} r$$

and is shorter than that of said second clock signals, and a converter circuit connected to said modulating circuit for producing a voltage corresponding to said number of said third clock signals, whereby a hyperbolic function of polygonal line approximation, the gradient of which changes at a fixed time interval, is generated.

2. A digital hyperbolic function generator according to claim 1 further comprising a comparator for comparing an output voltage of said converter circuit and an arbitrarily settable input voltage whereby said comparator produces a pulse signal the duration of which is in a hyperbolic function relation with said input voltage.

3. A digital hyperbolic function generator comprising means for generating first clock signals of a fixed frequency, a frequency dividing circuit for frequency dividing the first clock signals to produce second clock signals at a fixed time interval, a setting circuit connected to said frequency dividing circuit for changing the setting thereof in correspondence to the number $n$ of said second clock signals, said setting being produced in a binary code, a modulating circuit connected to said setting circuit for frequency modulating said first clock signals with said setting to produce third clock signals the period of which is proportional to $$1 + n + \sum_{r=1}^{n} r,$$

and a converter circuit for producing a voltage corresponding to the number of said third clock signals, whereby a hyperbolic function of polygonal approximation the gradient of which changes at every fixed time interval is generated.

4. A digital hyperbolic function generator comprising a setting circuit for counting clock signals of a fixed frequency to produce a binary coded output which is proportional to $$1 + n + \sum_{r=1}^{n} r,$$

where $n$ is the number of the counted clock signals, a modulating circuit connected to said setting circuit for producing pulse signals, the period of which corresponds to said binary coded output and is shorter than that of said clock signals, and a counter connected to said modulating circuit for counting said pulse signals, whereby a binary coded output which is an approximation of a hyperbolic function with time as a variable is generated.

* * * * *